United States Patent [19]

Donahue et al.

[11] Patent Number: 5,835,721
[45] Date of Patent: Nov. 10, 1998

[54] METHOD AND SYSTEM FOR DATA TRANSMISSION OVER A NETWORK LINK BETWEEN COMPUTERS WITH THE ABILITY TO WITHSTAND TEMPORARY INTERRUPTIONS

[75] Inventors: Clark P. Donahue, Santa Clara; Nikhil Bhatt, Campbell, both of Calif.

[73] Assignee: Apple Computer, Inc., Cupertino, Calif.

[21] Appl. No.: 686,020

[22] Filed: Jul. 25, 1996

Related U.S. Application Data

[63] Continuation of Ser. No. 518,597, Aug. 21, 1995, abandoned.

[51] Int. Cl.⁶ ........................................................ G06F 13/14
[52] U.S. Cl. ............................ 395/200.54; 395/200.57; 395/200.61; 395/200.64; 370/245
[58] Field of Search ......................... 395/788, 161, 395/800, 200, 140, 200.54, 201.57, 200.47, 200.61, 200.64, 182; 370/60, 88.7, 248

[56] References Cited

U.S. PATENT DOCUMENTS

| 5,230,051 | 7/1993 | Quan | 395/700 |
|---|---|---|---|
| 5,305,318 | 4/1994 | Ozeki et al. | 370/85.7 |
| 5,378,067 | 1/1995 | Severson et al. | 395/800 |
| 5,452,415 | 9/1995 | Hotka | 395/161 |
| 5,471,634 | 11/1995 | Giorgio et al. | 395/600 |
| 5,500,934 | 3/1996 | Austin et al. | 395/755 |
| 5,542,047 | 7/1996 | Armstrong | 395/200.11 |
| 5,557,744 | 9/1996 | Kobayakawa et al. | 395/200.01 |
| 5,568,476 | 10/1996 | Sherer et al. | 370/60 |
| 5,592,491 | 1/1997 | Dinkins | 370/277 |
| 5,615,323 | 3/1997 | Engel et al. | 395/140 |

OTHER PUBLICATIONS

Hess, Robert; "Apple, Farallon Seeing Infrared Across Mac Line", MacWeek, vol. 9, No. 23, Jun. 5, 1995.

Appletalk Data Stream Protocol (ADSP), Inside Macintosh, vol. VI, Apple Computer, Inc., 1991, pp. 32–37 to 32–78.

*Primary Examiner*—Christopher B. Shin
*Attorney, Agent, or Firm*—Beyer & Weaver, LLP

[57] ABSTRACT

A data transfer technique in which lossy connections or temporarily interrupted network links neither prevent data transfer nor substantially impair the ease with which a user can transfer data. A sender is advised of receivers on a network that are available to receive data over the network. Also, while data transfer from a sender to a receiver is being performed, the availability of the receiver is monitored. If, during the data transfer, the receiver becomes unavailable to receive the data, then the data transmission stops and the sender is informed that the receiver has become unavailable. The sender continues to monitor the network to determine if the receiver has regained its availability. If the receiver regains availability, the sender is able to automatically resume the data transmission, provided the availability is regained before the network connection is completely lost. The invention is useful for wireless networks as well as wired networks.

29 Claims, 13 Drawing Sheets

METHOD AND SYSTEM FOR DATA TRANSMISSION OVER A NETWORK LINK BETWEEN COMPUTERS WITH THE ABILITY TO WITHSTAND TEMPORARY INTERRUPTIONS

This is a continuation, of application Ser. No. 08/518,597 filed Aug. 21, 1995, abandoned.

BACKGROUND OF THE INVENTION

1. Field of the Invention

The present invention relates to data transfer between computers, and more particularly, to data transfer between computers using lossy connections.

2. Description of the Related Art

Conventional techniques exist to transfer data or files from one computer to another computer. In order to transfer the data, the two computers must be connected to a common network. The network can take numerous forms, including both wired and wireless networks. The network can consist of two or more computers or other devices capable of sending and/or receiving data. Examples of wired networks are local area networks, wide area networks, or simply a cable connecting ports of two different computers. Wireless networks can be interconnected with radio waves (RF communication) or light waves (e.g., infrared light transmission).

A problem primarily associated with wireless networks, but also occasionally present with wired networks, is lossy connections. In the wireless arena, lossy connections include, for example, an activity which temporarily interrupts the radio signals or light signals associated with the network. In the wired arena, lossy connections include, for example, an intermittent connection caused by damaged wires or loose connectors. Conventionally, when computers are interconnected via a network, lossy connections cause the connection to be closed.

Consequently, in a lossy environment, either data transmission is impossible, or if possible, the data transmission process has to be completely restarted. Restarting the data transmission process requires the regaining of the network interconnections after the lossy connection caused the connection to close during the data transmission process. The conventional approach is time-consuming and frustrating to a user who must work in a lossy environment.

Thus, there is a need for a data transfer method in which lossy connections do not substantially impair the ease with which data can be transferred.

SUMMARY OF THE INVENTION

Broadly speaking, the invention relates to a data transfer technique in which lossy connections or interrupted network links neither prevent data transfer nor substantially impair the ease with which a user can transfer the data.

A sender is advised of receivers on a network that are available (or eligible) to receive data over the network. Also, while data transfer from a sender to a receiver is being performed, the availability of the receiver is monitored. If, during the data transfer, the receiver becomes unavailable to receive the data, then the data transmission stops and the sender is informed that the receiver has become unavailable. The sender continues to monitor the network to determine if the receiver has regained its availability. For example, in the case of a wireless network, the receiver would be lost or temporarily unavailable when the wireless network link is interrupted. However, once the interruption clears, the sender is able to automatically resume the data transmission. As long as the interruption clears or is otherwise fixed before the network connection is completely lost, the burden on the user due to the lossy connections or interrupted network links is minimized. The invention is useful for wireless networks as well as wired networks. The invention can be implemented in many forms, including as a method, apparatus, system or computer readable medium.

As a method for transmitting data from a first computing device to a second computing device via a network, an embodiment of the invention includes: establishing a connection via the network from the first computing device to the second computing device, sending data from the first computing device to the second computing device over the network while monitoring the availability of the second computing device to receive the data over the network, and stopping the sending of the data and attempting to restore the availability of the second computing device to the network when the second computing device becomes unavailable.

As a method for transmitting data from a first computing device to a second computing device via a network, another embodiment the invention includes: searching the network for computing devices available to receive data over the network, displaying an indicator for each of the computing devices available to receive data on a display screen of the first computing device, establishing a connection via the network from the first computing device to the second computing device, and sending data from the first computing device to the second computing device over the network while monitoring the availability of the second computing device to receive the data over the network. Preferably, when the second computing device becomes unavailable the sending of the data stops and the method attempts to restore the availability of the second computing device to the network. It is also preferable that if the availability of the second computing device is regained before the connection is lost, then the sending of the data is resumed from the point where the transmission previously stopped.

As a method for transmitting data from a first computing device to a second computing device via a network, still another embodiment the invention includes: searching the network for computing devices available to receive data over the network, determining if the second computing device is one of the computing devices available to receive data over the network, establishing a connection via the network from the first computing device to the second computing device when the second computing device is available and when there is data to be transmitted from the first computing device to the second computing device, sending data from the first computing device to the second computing device over the network, monitoring the availability of the second computing device to receive the data over the network, suspending the sending of the data to the second computing device if the second computing device loses availability, maintaining the connection from the first computing device to the second computing device via the network during the suspending; resuming the sending of the data to the second computing device if the second computing device regains availability; and terminating the connection from the first computing device to the second computing device if the second computing device does not regain availability.

As a system for transmitting data from a first computing device to a second computing device, an embodiment of the invention includes: a network capable of interconnecting the first computing device to a plurality of other computing devices including the second computing device; search means for searching the network to determining which of other devices on the network are available to receive data from the first computing device; a display screen for displaying at least an indicator for each of the available devices on the network; data transfer means for transferring of data from the first computing device to the second computing device via a network link, provided one of the indicators on the display screen corresponds to the second computing device; a message window for displaying a message on the display screen of the first computing device when the second computing device becomes unavailable to receive the data after the transfer of data has begun but before the transfer of data is complete; and data transfer resumption means for resuming the transfer of data if the second computing device again becomes available. The system may further include a data queue for storing data transmission requests from the first computing device to other computing devices over the network, and a receiver availability list for use when determining whether receivers which were previously available have become unavailable.

As a computer readable medium containing program instructions for transmitting data over a network link, an embodiment of the invention includes: computer readable code devices for searching the network for computing devices available to receive data over the network, computer readable code devices for displaying an indicator for each of the computing devices available to receive data on a display screen of a first computing device, computer readable code devices for establishing a connection via the network from the first computing device to a second computing device, and computer readable code devices for sending data from the first computing device to the second computing device over the network while monitoring the availability of the second computing device to receive the data over the network.

As a user interface for a computer being visually displayed on a display screen of the computer system and being connected to a network of other devices, an embodiment of the invention includes: search means for searching the network to determine the devices on the network available to receive data from the computer system, display means for displaying a window having an indicator for each of the available devices on the network, means for periodically updating the window so that the indicators displayed provide an accurate account of the available devices, means for invoking a transfer of data from the computer system to one of the available devices, and a message window for displaying a message on the display screen of the computer system when the device to which data is being sent becomes unavailable to receive the data before the transmission of the data is complete.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–13B. However, those skilled in the art will readily appreciate that the detailed description given herein with respect to these figures is for explanatory purposes as the invention extends beyond these limited embodiments.

Figure 1:
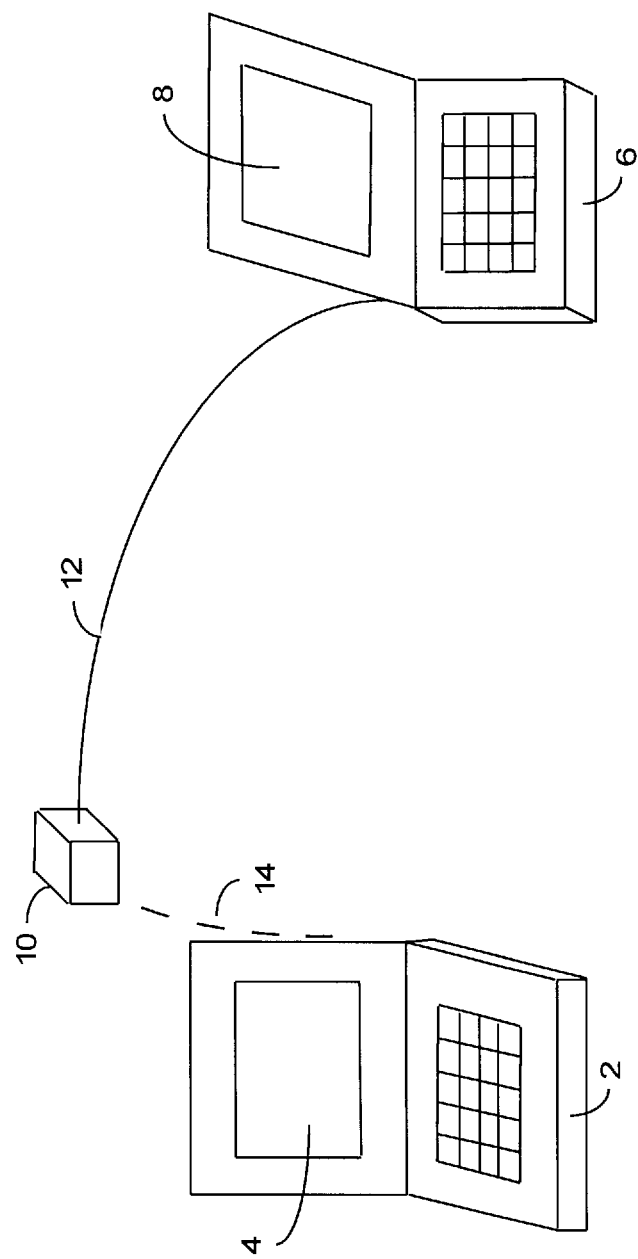
FIG. 1 is a schematic diagram illustrating two portable computers interconnected through a network.

FIG. 1 is a schematic diagram illustrating two portable computers interconnected through a network. Specifically, FIG. 1 illustrates the first computer 2 having a display screen 4 interconnected to a second computer 6 having a display screen 8. In this example, an external infrared (IR) device 10 is connected to the second computer 6 through a cable 12. The IR device 10 is interconnected to the first computer 2 through an infrared link 14. Hence, in this example, the network interconnecting the first computer 2 and the second computer 6 includes the infrared link 14. The infrared device 10 and the cable 12 are typically viewed as extensions of the first computer 6. However, the network could also be considered as including the IR device 10, the cable 12 and the infrared link 14.

The first computer 2 and the second computer 6 are more commonly interconnected without using the IR device 10 and its associated cable 12. Namely, the first and second computers 2, 6 can be connected with only the infrared link 14, but this requires that an infrared port (not shown) on the first computer 2 point to an infrared port (not shown) on the second computer 6. However, in the diagram shown in FIG. 1, it is assumed that the second computer 6 lacks an infrared port, thus the IR device 10 and its associated cable 12 in effect provide the second computer 6 with an infrared port. The IR device 10 offers greater flexibility in positioning the first and second computers 2, 6 because they need not point at each other.

Figure 2A:
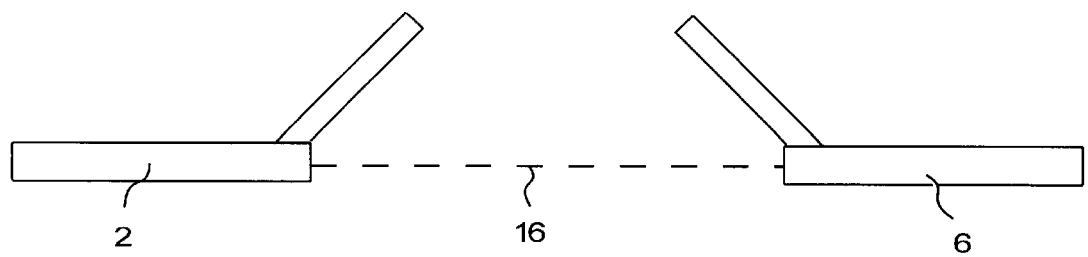
FIGS 2A–2C are schematic diagrams illustrating a temporary interruption of a network link between a first computer and a second computer.
Figure 2B:
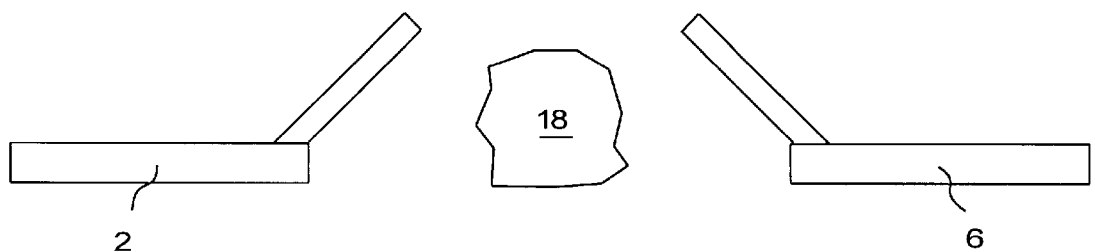
Figure 2C:
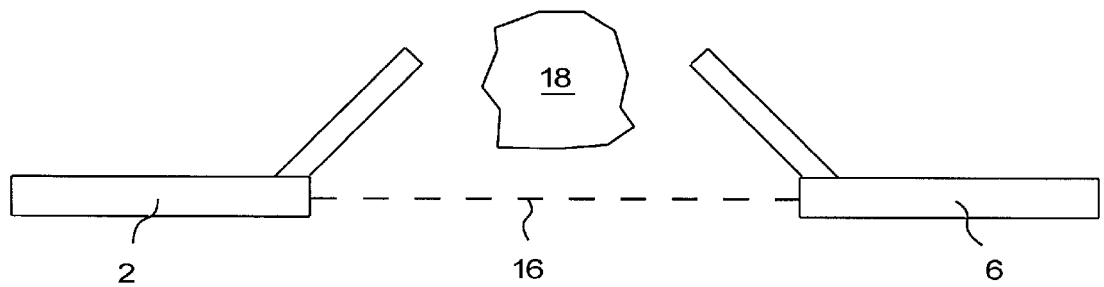

FIGS. 2A–2C are schematic diagrams illustrating a temporary interruption of a network link between first and second computers. In FIG. 2A, an infrared port on the first computer 2 is pointed directly at an infrared port on the second computer 6. This is known as point-to-point alignment. Typically, with portable computers, the infrared port is on the back of the computer. The first and second computers 2, 6 are then able to establish an infrared link 16 between the infrared ports of the respective first and second computers 2, 6. Data is then able to be transmitted between the first and second computers 2, 6 over the infrared link 16.

In FIG. 2B, the previously established infrared link 16 is shown as being interrupted by an object 18. The object 18 interrupts the light beam associated with the infrared link 16. As a consequence, the infrared link 16 is lost and can no longer be used to transmit data between the first and second computers 2, 6.

Alternatively, the infrared link 16 could likewise be interrupted by movement of one of the first and second computers 2, 6 such that the infrared ports no longer point (i.e., misaligned) to one another. For example, during a data transfer, a user might bump the first computer 2 sending it out of point-to-point alignment with the infrared port of the second computer 6. In this case, the infrared link 16 is also lost and unavailable to support data transmission.

FIG. 2C illustrates the situation after the object 18 no longer interferes with the infrared link 16. Namely, the infrared link 16 is only temporarily interrupted by the object 18. Once the object 18 no longer blocks the light beam associated with the infrared link 16, the infrared link 16 can be reestablished. Conventional approaches, however, are not able to resume the infrared link 16 without restarting the entire network connection and data transmission sequence. It is frustrating and a substantial burden on the user to have to restart the entire transmission sequence each time the link 16 is temporarily interrupted.

The invention provides novel network link management techniques to substantially eliminate the burdens on the user and otherwise the improved ease of use when network links are temporarily interrupted.

Figure 3:
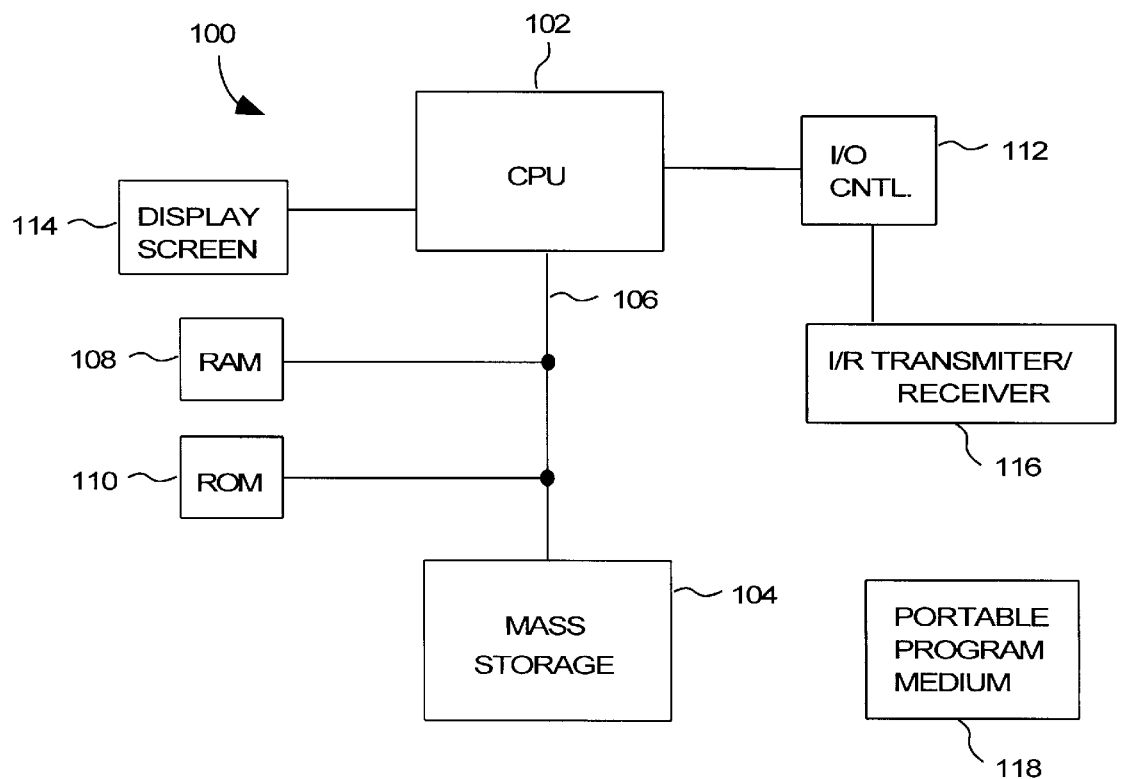
FIG. 3 is a block diagram of a computer system according to the invention.

FIG. 3 is a block diagram of a computer system 100 in accordance with the invention. The computer system 100, together with programming instructions or computer code associated with the operations of invention (described below), are able to carry out and obtain the benefits of the invention.

The computer system 100 includes a CPU 102 connected to a mass storage unit 104 via a bus 106. Also coupled to the bus 106 is a random-access memory (RAM) 108 and a read-only memory (ROM) 110. The RAM 108 typically includes data and programming instructions. The ROM 110 includes basic operating instructions, data and objects used by the computer system 100 to perform its functions. The mass storage unit 104 generally includes additional programming instructions, data and objects that are not in active use by the CPU 102. The computer system 100 further includes a display screen 114 for viewing text and images generated or displayed by the computer system 100. Additionally, an I/O controller 112 is coupled to the CPU 102 to control input/output operations (including network connections) with the computer system 100. In the embodiment shown in FIG. 3, the I/O controller 112 is coupled to and controls an I/R transmitter/receiver 116. Typically, the I/R transmitter/receiver 116 is built into the housing of the computer system 100 (such is commonly known as an infrared port). For example, in the first and second computers 2, 6 shown in FIG. 1 and FIGS. 2A–2C, the I/R transmitter/receiver 116 is associated with an infrared port built into the back of the portable computers 2, 6.

The CPU 102 together with an operating system (not shown) operate to execute computer code or programming instructions. The computer code may reside on the RAM 108, the ROM 110, or a mass storage unit 104. The computer code could also reside on a portable (or removable) program medium 118 and then loaded or installed onto the computer system 100 when needed. Portable program mediums 118 include, for example, CD-ROMS, PCMCIA devices, RAM devices, floppy disk, magnetic tape.

The transfer of data between a first computer and a second computer is achieved through a network. The computer that is transferring data to the other computer is the sending side computer. The computer receiving the data from the other computer is the receiving side computer. The sending side computer performs send-side processing when sending data. The receiving side computer performs receive-side processing when receiving data. Preferably, the send-side processing and the receive-side processing are each objects of object-oriented programming. Each computer can operate as the send-side or the receive-side. Further, a single computer can both send and receive simultaneously.

Figure 4:
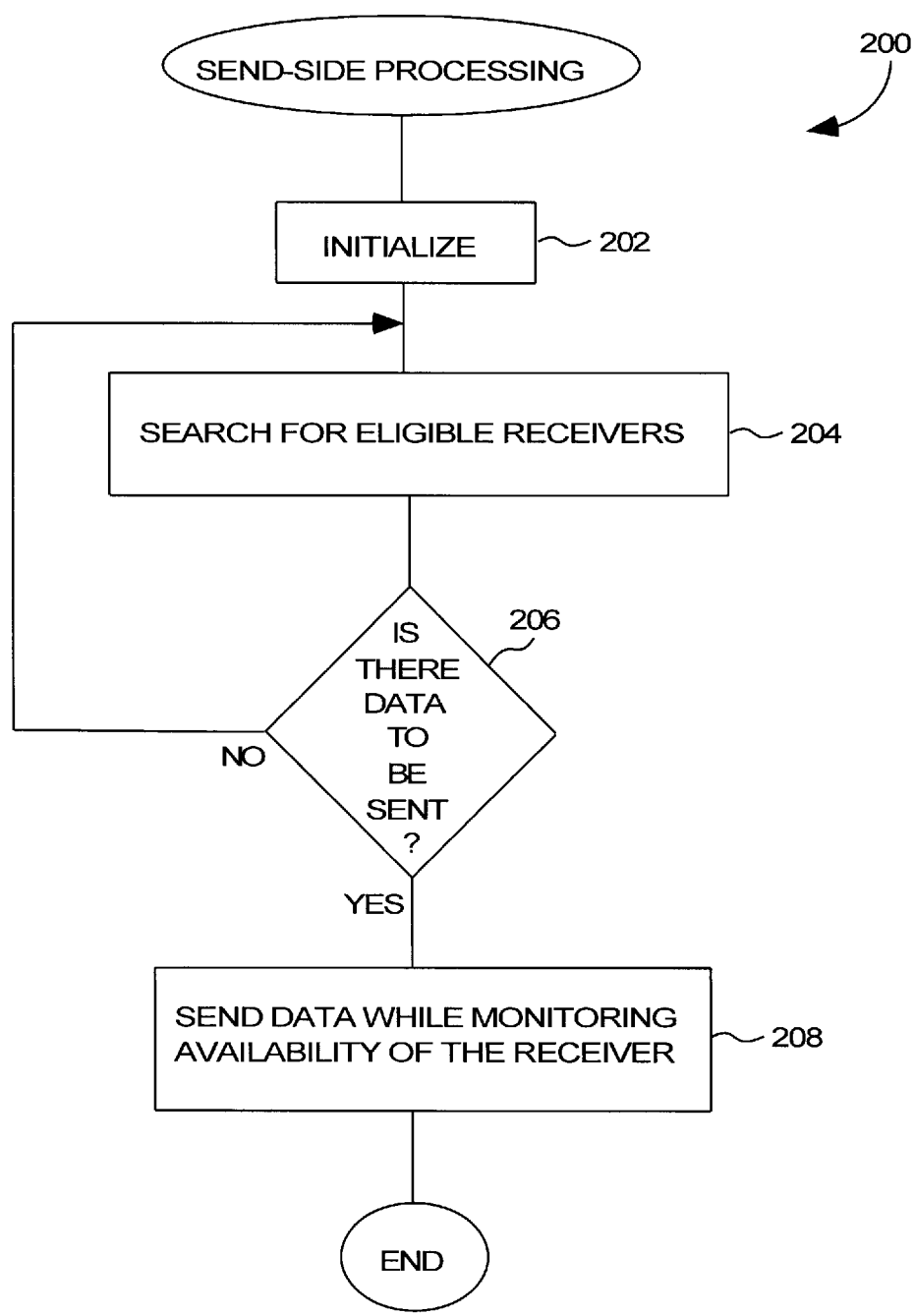
FIG. 4 is a flow chart illustrating send-side processing in accordance with a basic embodiment of the invention.

FIG. 4 is a flow chart of send-side processing 200 according to a basic embodiment of the invention. The send-side processing 200 first initializes 202 the mechanism for transferring data from the sending computer to the receiving computer. Next, the sending computer (sender) searches 204 for available receiving computers (receiver). Here, the sending computer operates to determine which computers are available to receive data through the network. Then, a decision 206 is made based on whether there is data to be sent. If there is no data to be sent, then the send-side processing 200 returns to repeat block 204 until there is data to be sent. Once there is data to be sent, then the data is sent 208 while the availability of the receiver of the data is monitored. As long as the receiver remains available, the data continues to be sent 208. However, should the receiver become unavailable, then the data ceases being sent 208 until the availability of the receiver is reacquired.

Figure 5A:
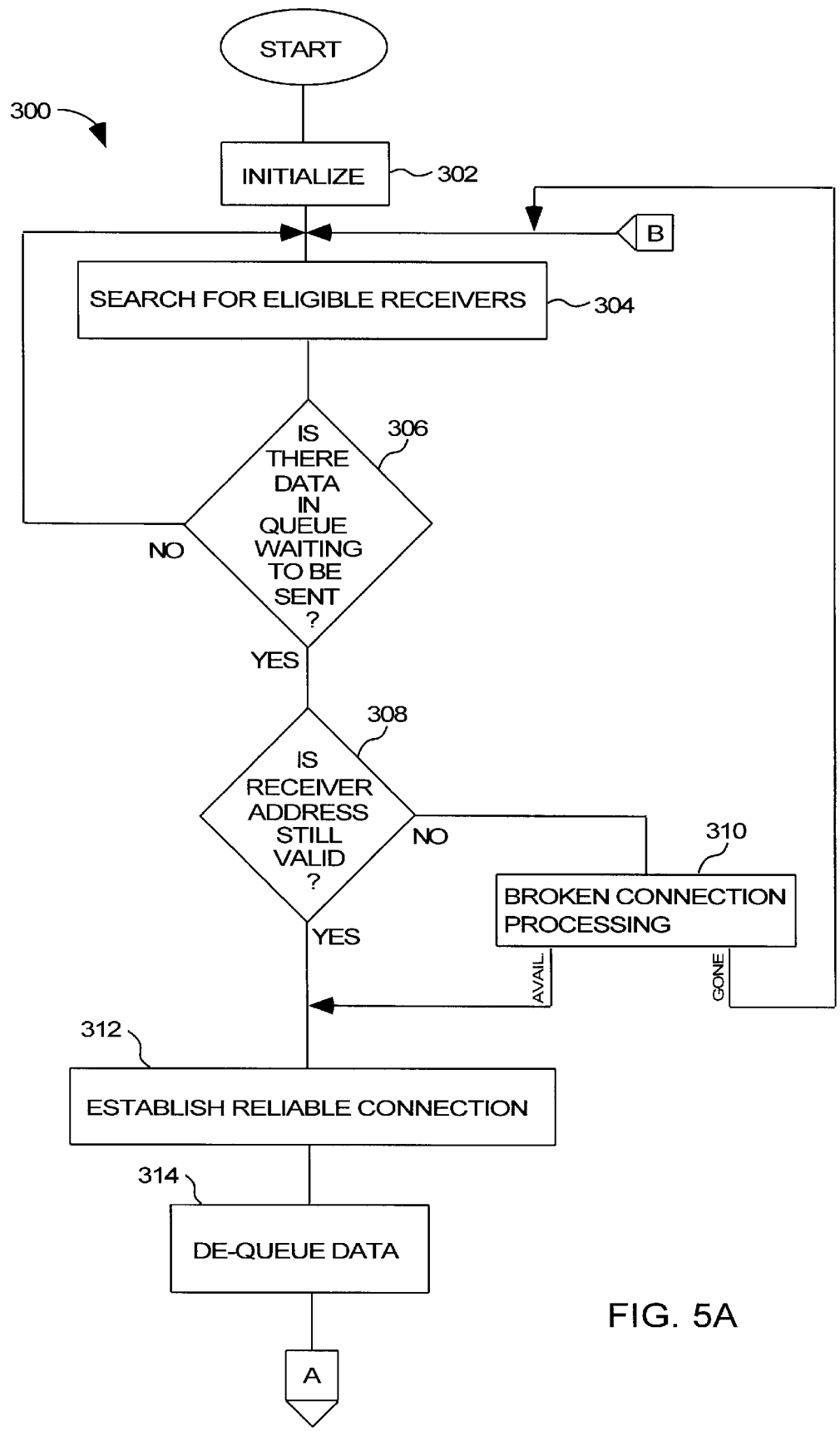
FIGS. 5A and 5B are flow charts illustrating send-side processing in accordance with a preferred embodiment of the invention.
Figure 5B:
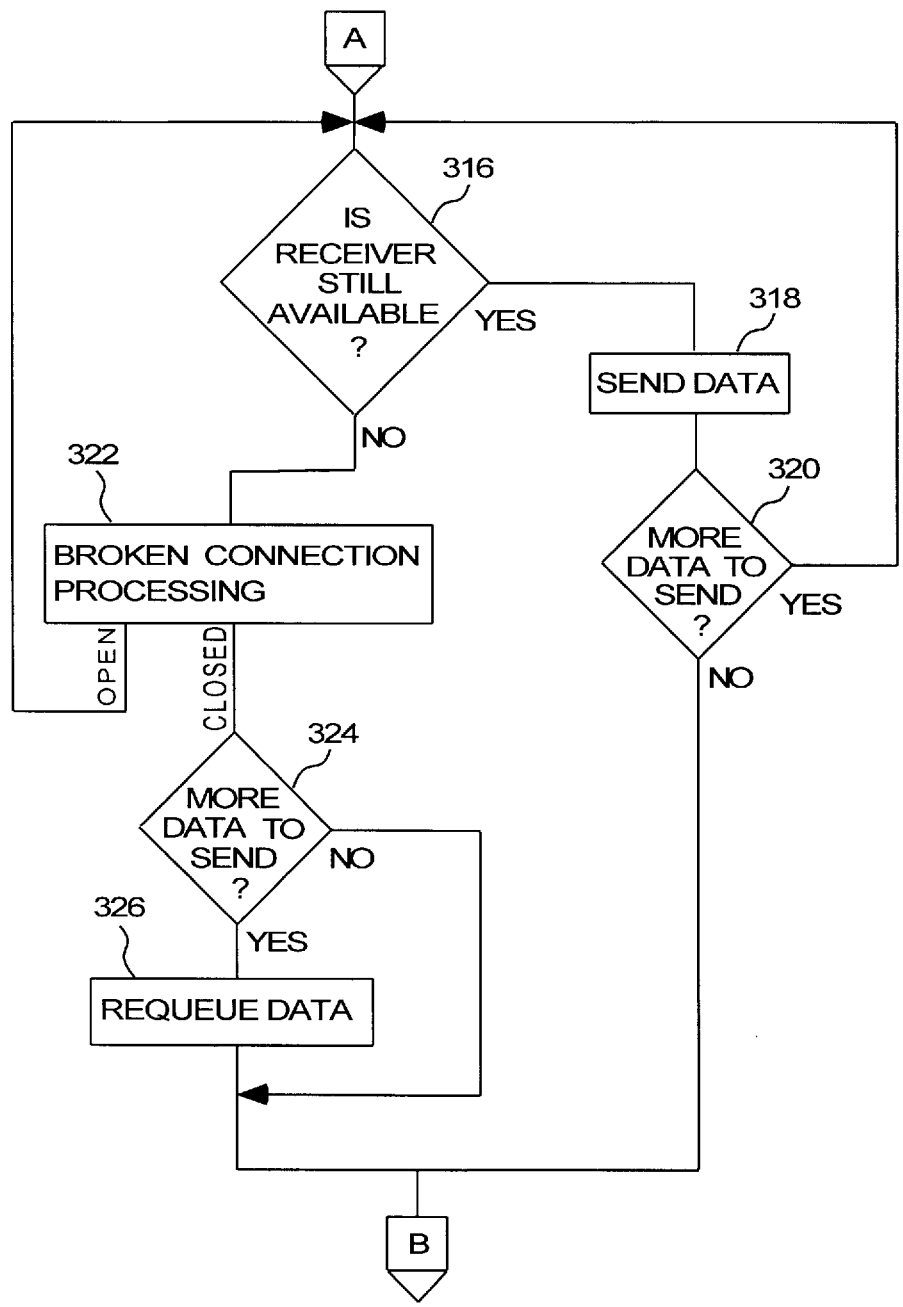

FIGS. 5A and 5B are flow charts illustrating send-side processing 300 in accordance with a preferred embodiment of the invention.

The send-side processing 300 first initializes 302 the mechanism for transferring data from the sending computer to the receiving computer. The initialization 302 includes initializing the network transfer protocol as well as various programming objects being utilized. Then, the send side processing 300 searches 304 for available receivers on a network. Next, a decision 306 is made based on whether there is data in a data queue waiting to be sent. If there is no data in the data queue waiting to be sent, the send-side processing 300 returns to repeat block 304 until there is data in the data queue to be sent. Once there is data in the data queue to be sent, a decision 308 is made based on whether the receiver address is still valid. Here, the decision 308 is a verification that the particular receiver to receive the data is still available prior to starting the data transfer. Name Binding Protocol (NBP) can be used for this purpose. If the receiver address is no longer valid, then broken connection processing 310 is performed. If the result of the broken connection processing 310 is that the connection is gone, then processing returns to block 304. On the other hand, if the broken connection processing 310 indicates that the receiver is now available, then the send-side processing 300 is resumed. Hence, following decision block 308 when the receiver address is still valid or following the broken connection processing block 310 when the receiver is available, a reliable connection is established 312. Then, the data to be sent is dequeued 314 from the data queue.

Next, a decision 316 is made based on whether the receiver is still available. The decision 316 uses the results of the last network search 304. The network search 304 is preferably a concurrent process invoked every 5 seconds just prior to and during data transfer. If the receiver is still available, then the data is sent 318 from sender to receiver over the network. The sending 318 of the data means that the data starts to stream out from the sender to the receiver via the network. A decision 320 is then made to determine whether there is additional data to send. If there is additional data to send, then the send-side processing 300 returns to repeat block 316. As long as the receiver is still available, the data will be continually sent 318 until all of the data has been sent. Preferably, at least a portion of the data is sent to a buffer which forwards the data to the network and then when decision blocks 316 and 320 are still affirmative, additional portions of the data are sent to the buffer as space becomes available in the buffer. After all of the data has been sent, the send-side processing 300 returns to block 304 and the send-side processing 300 repeats for the sending of other data to a receiver.

On the other hand, when the receiver is no longer available, the decision block 316 causes broken connection processing 322 to be performed. If the broken connection processing 322 determines that the connection is open and the receiver is again available (i.e., physical link is reestablished), then processing returns to repeat decision block 316. Thus, the data can be sent 318 even after being temporarily stopped or interrupted because of a temporary loss of the receiver. If the broken connection processing 322 determines that the connection is closed, then the connection is lost. Hence, a decision 324 is made based on whether there is more data to be sent. If there is additional data to be sent, the data is requeued 326. In any event, following block 324 when no additional data needs to be sent, block 326, or block 320 when no additional data needs to be sent, the send-side processing 300 returns to repeat block 304 and blocks thereafter of the send-side processing.

Figure 6:
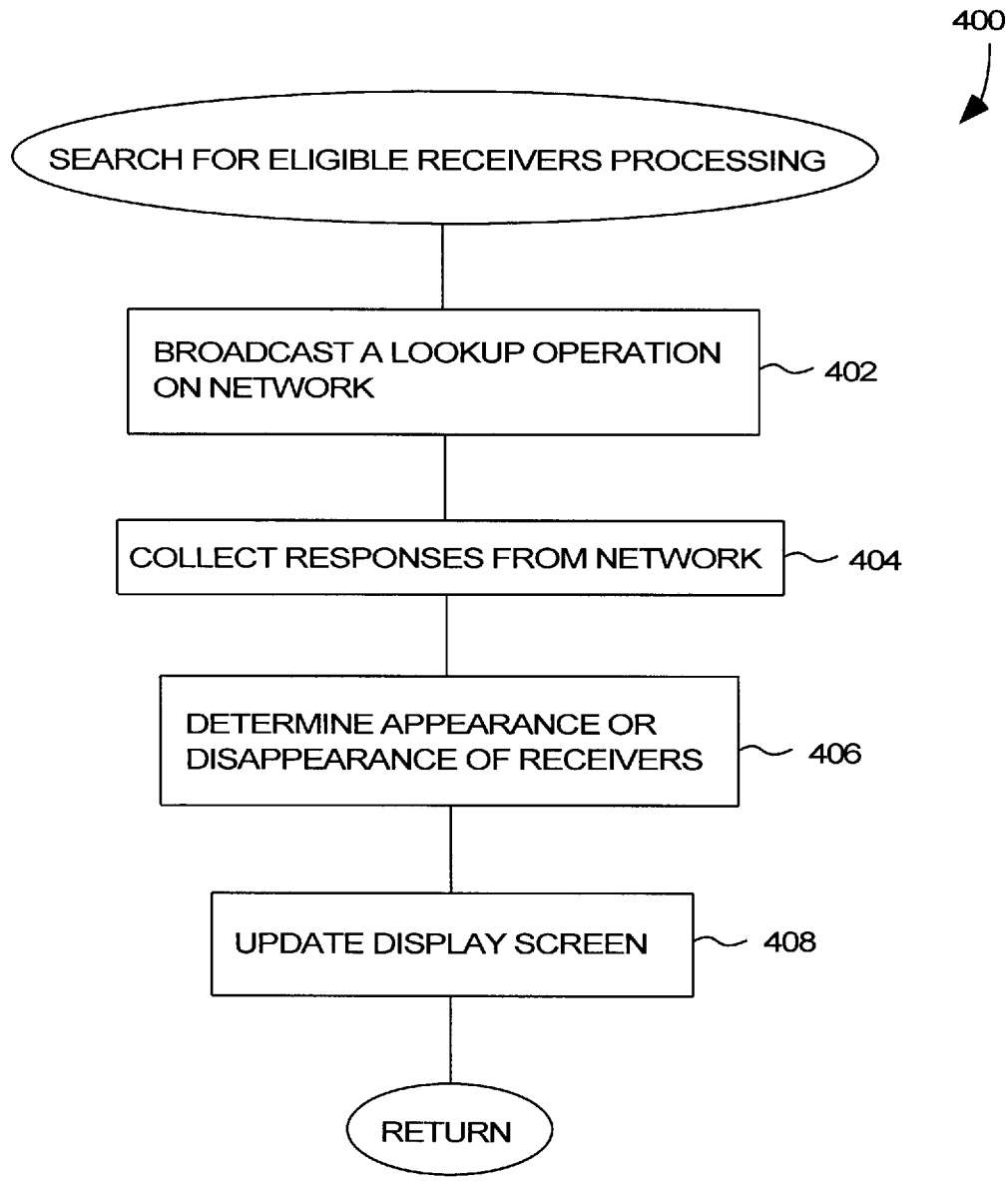
FIG. 6 is a flow chart illustrating search for available receivers processing in accordance with the invention.

FIG. 6 is a flow chart illustrating search for available receivers processing 400 in accordance with the invention. The search for available receivers processing 400 is performed by block 204 in FIG. 4 and block 304 in FIG. 5A.

Figure 12:
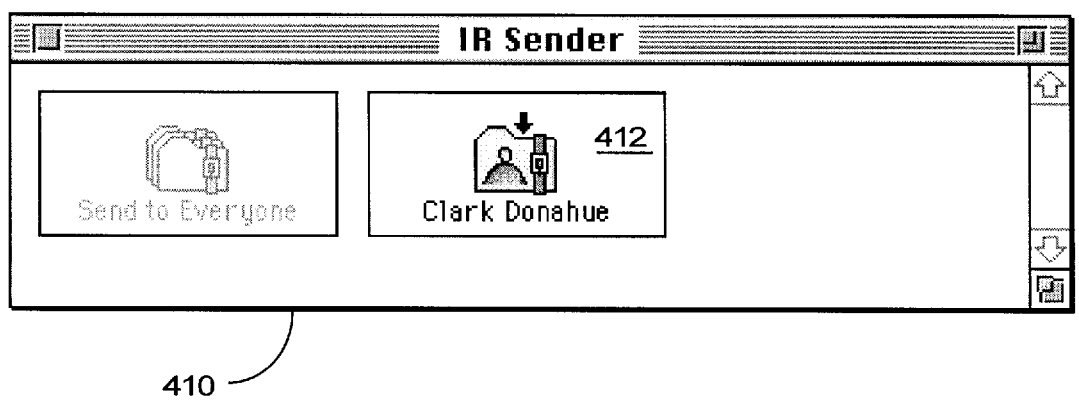
FIG. 12 is a representative illustration appearing on a display screen indicating available receivers.

The search for available receivers processing 400 broadcasts 402 a lookup operation on a network. Preferably, the broadcast 402 is implemented by a concurrent process that performs the lookup operation by broadcasting over the network using the NBP protocol. The responses from the network are then collected 404. The search for available receivers processing 400 then determines 406 whether receivers have appeared or disappeared since the last determination of their presence or absence was made. This can be achieved by maintaining a list or table of the receivers which are available to receive data. Then, the next time the determination 406 is made, the list or table is used as a reference. Next, a display screen associated with the sender is updated 408 so as to illustrate only the receivers which are currently available. Preferably, the display screen illustrates an icon for each available receiver. However, it should be noted that the receivers themselves will typically have the sending side processing operations in effect as well so that their display screens will also be updated. For example, in FIG. 12, a representative window 410 is illustrated. The window 410 would be displayed on the display screen of the sending side computer to visually indicate to the user which receivers are available to receive data over the network. In FIG. 12, icon 412 indicates that the receiver identified as "Clark Donahue" is available to receive data. The receivers that remain available continue to be displayed, the receivers which have become available are newly displayed, and the receivers which have become unavailable are no longer displayed.

Figure 10:
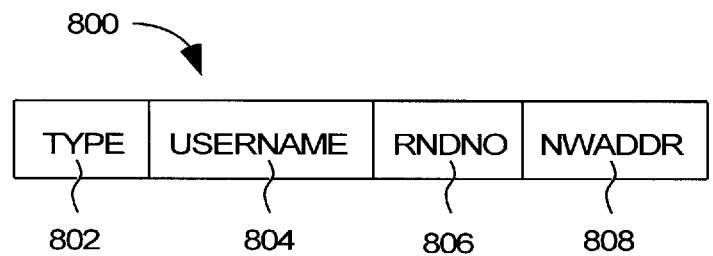
FIG. 10 is a schematic diagram of a receiver identifier of an availability table.

FIG. 10 is a schematic diagram of a receiver identifier (table entry) 800 of an availability table. The availability table lists the receivers available to receive data. The availability table is preferably searched and then updated during the search for available receivers processing 400. The table entry 800 is a unique identifier for the receiver. In this example, the availability table would include a table entry 800 for each available receiver. The table entry (receiver identifier) 800 includes: a type 802, a user name 804, a random number 806, and a network address. The type 802 indicates the type of data transfer protocol. The user name 804 indicates the user name of the receiver. For example, if the user of the receiving side computer is Clark Donahue, then "Clark Donahue" would be stored in the user name 804. The random number 806 is used to ensure that the receiver identifier is unique. Here, the combination of the user name 804, the random number 806 and the network address 808 is guaranteed to be unique. The network address 808 is used to open a connection to the corresponding receiver.

Hence, when the search for available receivers processing 400 determines 406 the appearance or disappearance of receivers, the receiver identifier 800 shown in FIG. 10 can be used within one or more availability tables to store previously available receivers, currently available receivers, or both.

Figure 11:
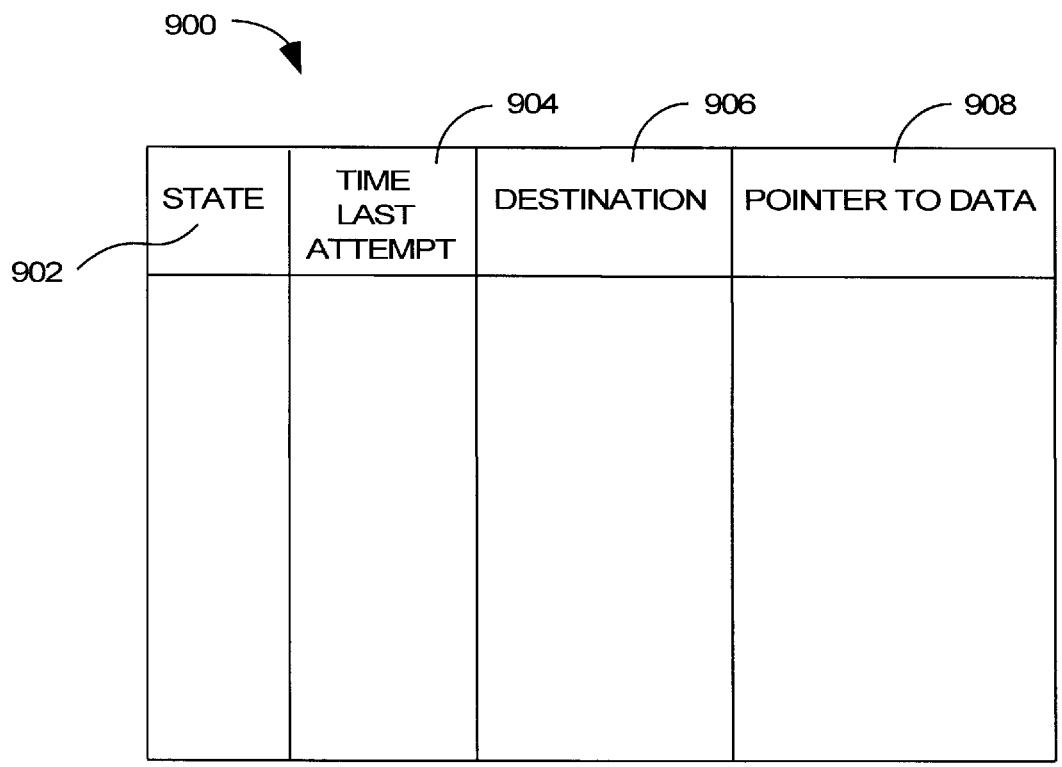
FIG. 11 is a schematic diagram of a data queue used in accordance with the invention.

FIG. 11 is a schematic diagram of a data queue 900 used in accordance with the invention. The data queue 900 contains the data transmission requests. The data transmission requests are processed by transmission request processing 500 discussed below with reference to FIG. 7. Each entry in the data queue 900 contains a state 902, time 904 of last attempted transfer, a destination 906, and a pointer 908 to the data to be transmitted. The state 902 can be one of: waiting, busy and out of range. The waiting state is the initial state of the data transmission requests and it corresponds to the situation in which the receiver is believed to be available. When the receiver is believed to be available, its icon is displayed on the display screen of the sending side computer. The busy state indicates that the receiver is currently busy with another data transmission request to the receiver. The out of range state indicates that the receiver is off the network. When the state is out of range, the icon associated with the receiver is not displayed on the display screen of the sending side computer. The time 904 of last attempted transfer to the receiver is saved for all entries to that receiver when the receiver is busy. The time 904 can then be used in selecting items from the data queue 900. The destination 906 is the destination address of the receiver and may take the form of the data structure shown in FIG. 10. The pointer 908 points to the block of data to be transferred for the corresponding data transfer request.

Figure 7:
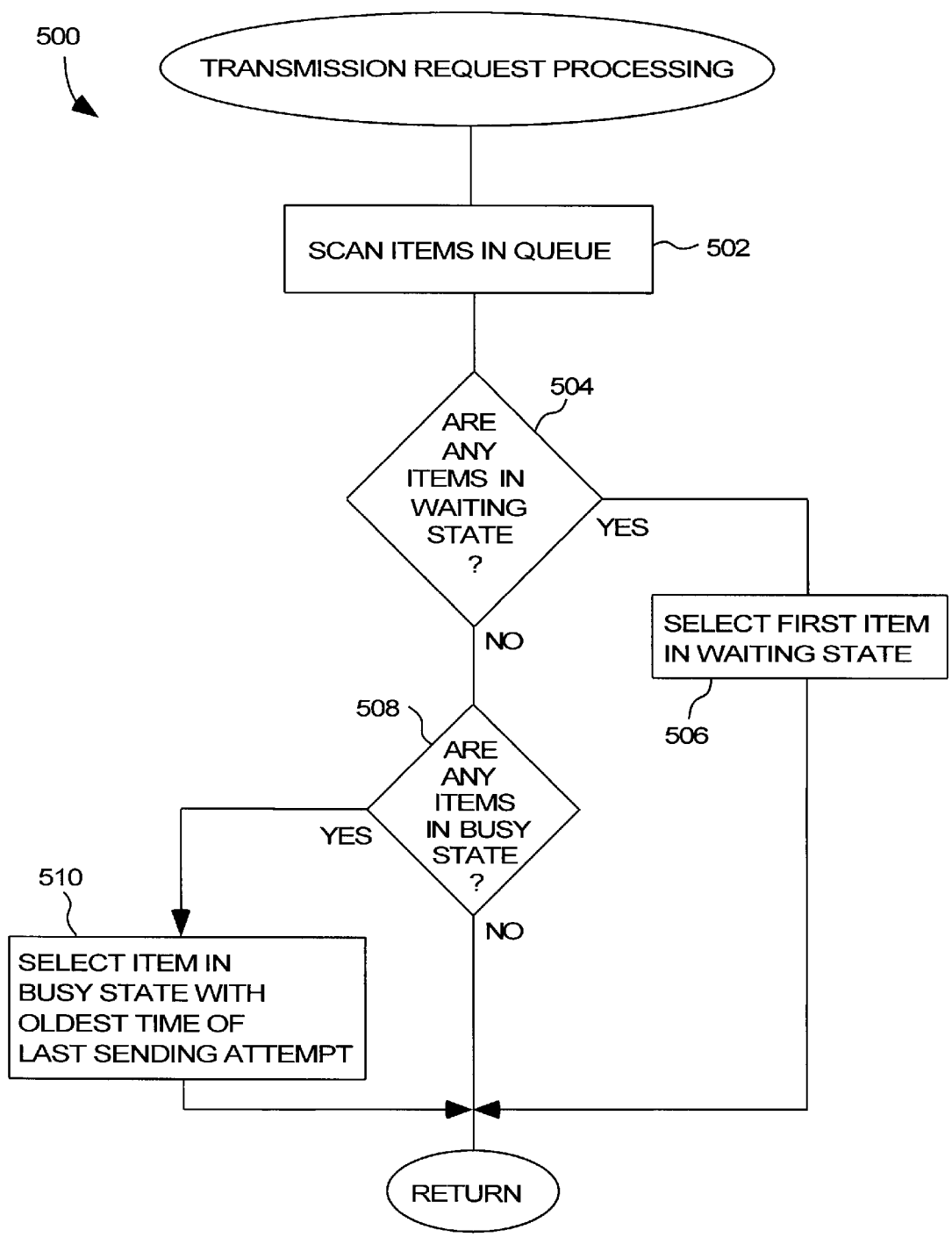
FIG. 7 is a flow chart illustrating transmission request processing in accordance the invention.

FIG. 7 is a flow chart illustrating transmission request processing 500 in accordance with the invention. The transmission request processing 500 is the processing preferably performed when the sending side computer has data it desires to send to one or more receivers. The transmission request processing 500 scans 502 items in the data queue of the sending computer. A decision 504 is then made based on whether there are any items within the data queue that are in a waiting state. If there are items in the waiting state, then the first item in the waiting state is selected 506. Alternatively, if there are no items in the waiting state, then a decision 508 is made based on whether there are any items in the data queue that are in a busy state. If there are one or more items in the data queue in the busy state, then the item in the busy state which has the oldest time of last sending attempt is selected 510. The time 904 of last attempted transfer is held in the data queue 900. Following block 506 and 510, as well as block 508 when there are no items in the busy state, the transmission request processing 500 is complete and returns. Thus, the transmission request processing 500 determines the order in which the items in the data queue are to be transmitted over the network.

Note that the send-side processing 300 discussed above with reference to FIGS. 5A and 5B also operates on the data queue 900. When the data to be sent is dequeued (block 314, FIG. 5A), the data to be sent is withdrawn from the data queue and forwarded to a sending object which performs the above described processing. As the data is transferred, a progress bar is preferably displayed on the display screen associated with the sending side computer so as to inform the user of the progress of the data transfer. If the data transfer is stopped due to an interruption, the progress bar would in effect show lack of progress. On the other hand, when the data being sent is requeued (block 326, FIG. 5B), it is returned to the data queue 900 and its state is indicated as the out of range state.

Figure 8:
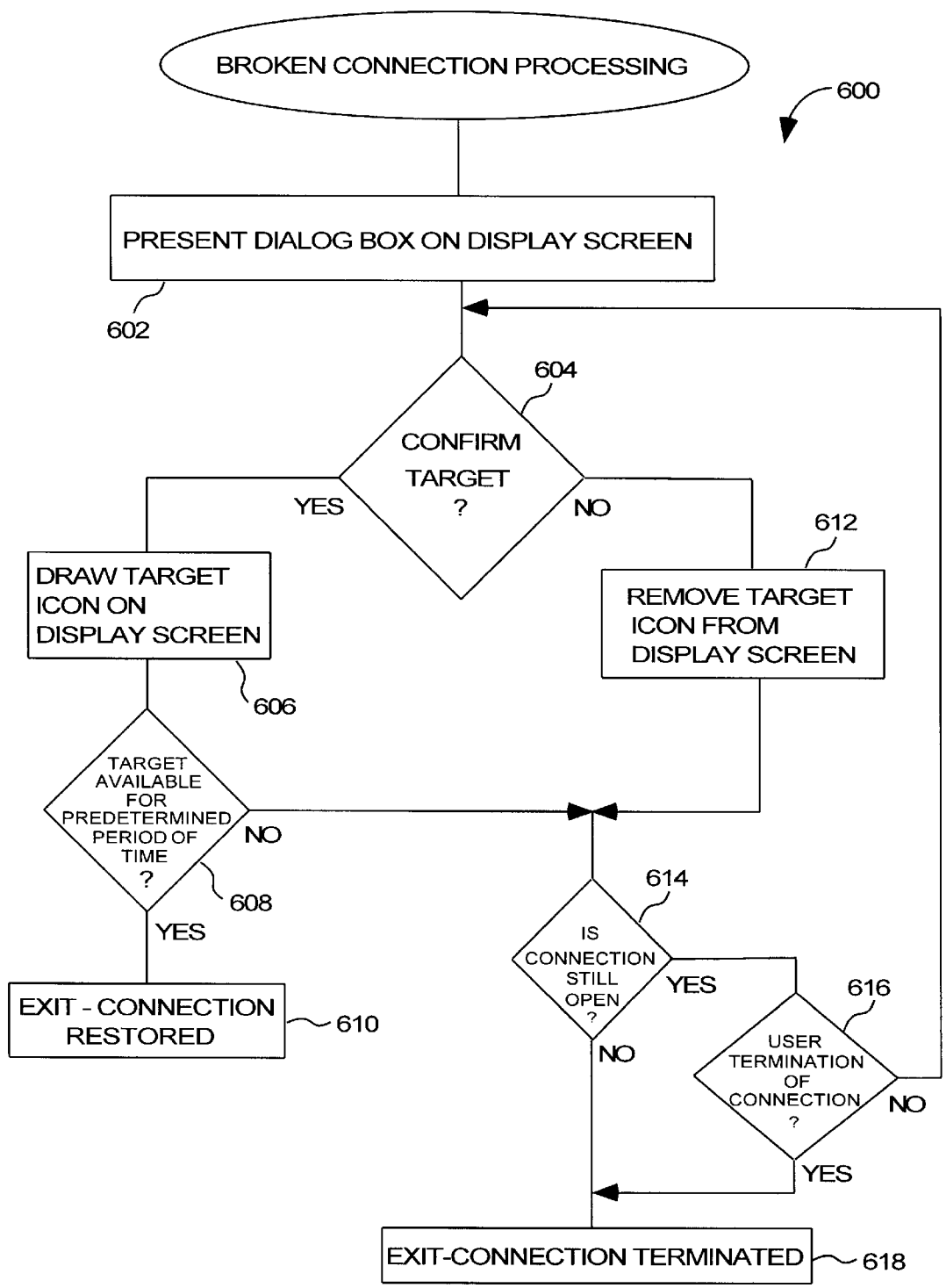
FIG. 8 is a flow chart of broken connection processing in accordance with the invention.

FIG. 8 is a flow chart of broken connection processing 600 in accordance with the invention. The broken connection processing 600 details the operations performed by block 310 in FIG. 5A and block 322 in FIG. 5B (as well as block 710 in FIG. 9 to be discussed below).

Figure 13A:
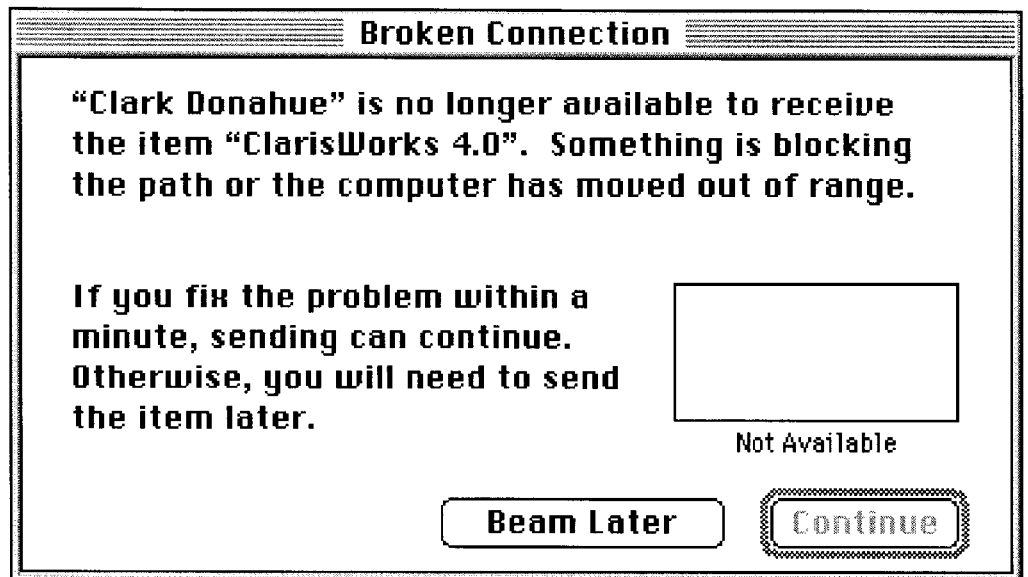
FIGS. 13A and 13B are representative illustrations appearing on a display screen during broken connection processing.
Figure 13B:
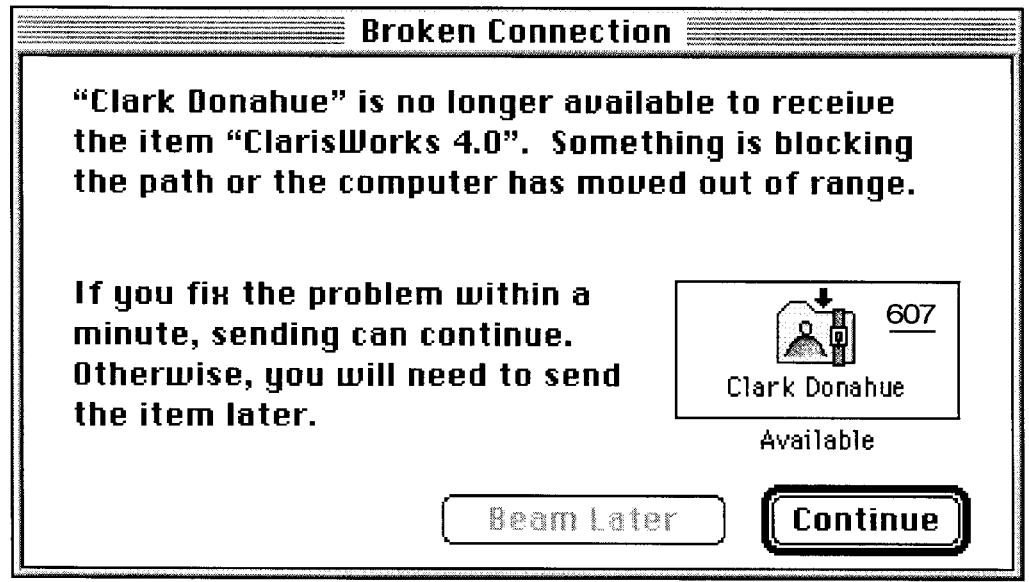

The broken connection processing 600 presents 602 a dialog box (or message window) on the display screen. Since both the send-side processing 300 and the receive-side processing 700 perform the broken connection processing 600, the sender (i.e., sending side computer) can be presented with the dialog box, and/or the receiver (i.e., receiving side computer) can be presented with a dialog box. The contents of the dialog box informs the user that a broken connection is present. FIG. 13A illustrates an example of a dialog box 603 that would appear on the display screen of the sending side computer when a broken connection results during the sending of "ClarisWorks 4.0" to the receiver "Clark Donahue". Next, a decision 604 determines whether the target (sender or receiver) is confirmed (i.e., still valid). The target for the sender is the receiver, and the target for the receiver is the sender. If the target is confirmed, then its icon is drawn 606 on the display screen. FIG. 13B illustrates the dialog box 603 with the icon 607 for the receiver drawn when the target has been confirmed. Then, a decision 608 determines whether the target has been available for a predetermined period of time. Preferably, the predetermined period of time is on the order of five seconds. The predetermined period of time provides a lag in the processing so that connection availability cannot immediately follow connection unavailability. Nevertheless, those in the art will recognize that the predetermined period of time could be longer, shorter or eliminated completely. If the target has been available for the predetermined period of time, then the broken connection processing 600 exits 610 with an indication that the connection is restored or fixed (i.e., available or open).

With the invention, the data transmission can resume despite having been interrupted temporarily. For example, in the case where the first computer and the second computer which were previously aligned, become unaligned during data transmission, the broken connection processing 600 enables the user to realign the first and second computers 2, 6 so that the data transmission can be resumed. Hence, the user is able to quickly determine whether the computers have become misaligned as well as realigned. Further, the user no longer needs to restart the entire data transmission request because the data transmission will resume without any or minimal effort by the user.

On the other hand, when the decision block 604 determines that the target is not confirmed, then the target icon is removed 612 from the display screen (e.g., FIG. 13A). Following block 612 or following decision block 608 when the target does not persist for the predetermined period of time, a decision 614 is made based on whether the connection is still open. If the connection is still open, a decision 616 determines whether the user has terminated the connection manually. If the user has not terminated the connection manually, the broken connection processing 600 returns to decision block 604 so that it can again be determined whether the target has been reacquired by the network. On the other hand, if the connection is no longer open or if the user has terminated the connection, the broken connection processing 600 exits 618 with an indication that the connection was terminated.

Figure 9:
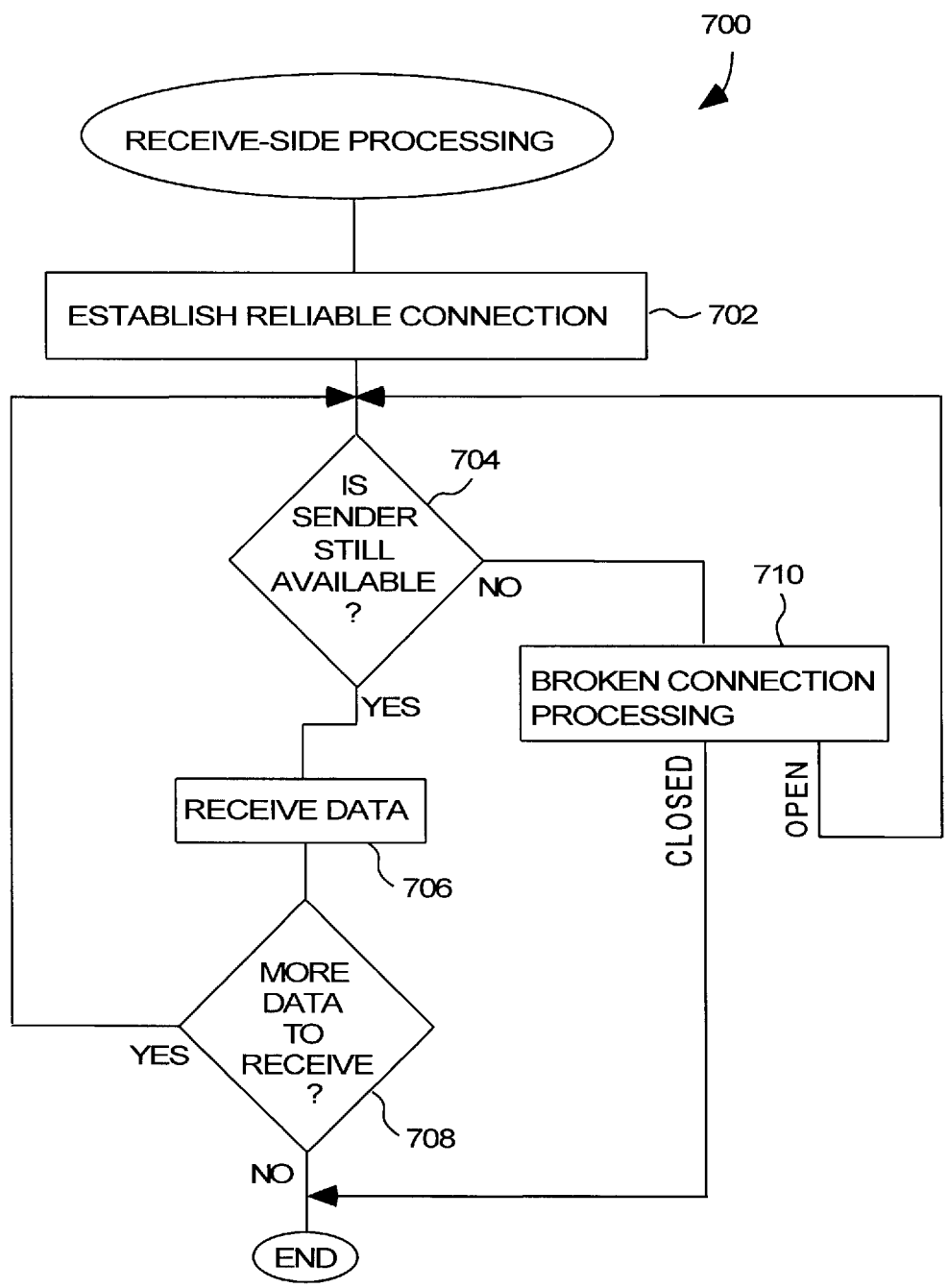
FIG. 9 is a flow chart of receive-side processing in accordance with the invention.

FIG. 9 is a flow chart of receive-side processing 700 in accordance with the invention. The receive-side processing 700 is the processing carried out by the receiver (i.e., receiving side computer). As indicated above, each computer can simultaneously operate as a receiver and sender of data.

The receive-side processing 700 establishes 702 a reliable connection to the sender. The details on the establishment 702 of the reliable connection were explained above with respect to block 312 of FIG. 5A. Next, a decision 704 is made based on whether the sender is still available on the network. If the sender is still available, the decision 704 causes data to be received 706 at the receiver. A decision 708 is then made based on whether there is more data to receive. If there is more data to receive, then processing returns to block 704 so that the additional data can be received 706 so long as the sender is still available to the receiver via the network. If the sender is not available to the receiver, then broken connection processing 710 is performed. The details of the broken connection processing were discussed above with respect to FIG. 8. Namely, if the sender becomes unavailable over the network to the receiver, then the broken connection processing 710 will attempt to reestablish the network link by notifying the user of the interruption (e.g., broken connection), and thereafter, monitoring the network for reacquisition of the receiver. This provides time for either an interfering object to move out of the path of the network link or allows the user to realign one or both the sender and the receiver when they have become unaligned.

In effect, the invention causes a logical network link to be maintained between the sending and receiving computers even though the physical link between the sending and receiving computers is lost. So long as the physical link can be returned within a predetermined period of time, the sending and receiving of data can function as if the network link was never lost, but merely briefly interrupted. For example, as shown in FIGS. 2A–2C, if the foreign object 18 temporarily blocks the infrared link 16 (FIG. 2B), the sending and receiving need not be restarted but can be resumed automatically once the foreign object clears the network link 16 (FIG. 2C).

The resumption of the data transfer is preferably continued where the data transfer was interrupted. For example, when transferring 1,000 bytes of information from the sending computer to the receiving computer, if interrupted following transmission of the $501^{st}$ byte, then the processing would resume with the sending and receiving of the $502^{nd}$ byte and subsequent bytes. Here, it is also assumed that the network transfer protocol provides a guaranteed delivery (such as ADSP for AppleTalk networks or TCP for IP networks). Alternatively, the data transfer could require the entire 1000 bytes be sent upon resuming data transfer following an interruption.

The computer involved in the data transmission can be any computer device. When the computer is a Macintosh brand computer produced by Apple Computer, Inc., the network is preferably AppleTalk and the protocol is preferably AppleTalk Data Stream Protocol (ADSP). ADSP provides full-duplex data stream connection between two nodes on the AppleTalk network. Even though ADSP appears to its clients to handle data as a stream of bytes, the data is actually transmitted and received by Datagram Delivery Protocol (DDP) in packets. DDP packets are transmitted onto the network by the link layer depending on the type of network (e.g., IRTalk-IR link, LocalTalk, LocalTalkNet, EtherTalk-ethernet).

Every ADSP connection is between two sockets in an AppleTalk network. The combination of a socket and the ADSP information maintained by the socket is referred to as a connection end. An open connection exists when two connection ends establish communication. When both connection ends terminate the link between the sockets and dispose of the connection information each maintains, the connection is a closed connection. However, if one connection end is established but the other connection end is unreachable or has disposed of its connection information, the connection is considered a half-open connection. No communication can occur over a half-open or closed connection. ADSP automatically closes any half-open connections that are not reestablished within two (2) minutes. For more details on AppleTalk and ADSP, see "Inside Macintosh, Vol. VI", Apple Computer, Inc., 1991 and "Inside AppleTalk", Apple Computer, Inc.

Hence, in an embodiment of the invention using AppleTalk and ADSP, there is a window of two (2) minutes in which the temporary interruption must be fixed before the network protocol closes the connection. Block 614 of FIG. 8 monitors whether ADSP has closed the connection.

The data transfer is preferably a file exchange or a file transfer. The sender sending side computer and the receiving side computer may be general purpose computer, dedicated computers, or some other computing device. Examples of other computing devices include: servers, microprocessor based peripheral devices (e.g., printers), storage devices, network controllers, and the like.

Although the emphasis of the above-described embodiments is on a wireless network using infrared beams, other wireless technologies (such as radio (RF)) can equally be used. Radio could be temporarily interrupted by some sort of electromagnetic disturbance. Wired technologies could also be used with the invention because wires or connections may be intermittent (e.g., bent connector pins, broken wire, etc.)

The many features and advantages of the invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for transmitting data from a first computing device to a second computing device via a network, said method comprising:

(a) establishing a connection via the network from the first computing device to the second computing device;

(b) sending data from the first computing device to the second computing device over the network while monitoring the availability of the second computing device to receive the data over the network; and (c) stopping said sending (b) of the data when the second computing device becomes unavailable;

(d) determining whether the second computing device regains availability before the connection is lost; and (e) resuming said sending (b) of the data after a temporary interruption when said determining (d) determines that the availability of the second computing device is regained before the connection is lost.

2. A method as recited in claim 1, wherein the first and second computing devices are portable computers, and the network is a wireless network established between the portable computers.

3. A method for transmitting data from a first computing device to a second computing device via a network, said method comprising:

(a) searching the network for computing devices available to receive data over the network;

(b) displaying an indicator for each of the computing devices available to receive data on a display screen of the first computing device;

(c) establishing a connection via the network from the first computing device to the second computing device;

(d) sending data from the first computing device to the second computing device over the network while monitoring the availability of the second computing device to receive the data over the network;

(e) stopping said sending (d) of the data when the second computing device becomes unavailable;

(f) determining whether the second computing device regains availability before the connection is lost; and (g) resuming said sending (d) of the data after a temporary interruption when said determining (f) determines that the availability of the second computing device is regained before the connection is lost.

4. A method as recited in claim 3, wherein the network is a wireless network.

5. A method as recited in claim 4, wherein the first and second computing devices are portable computers, and the wireless network is a dedicated wireless infrared link established between the portable computers.

6. A method as recited in claim 3, wherein when said (g) resuming of said sending (d) of the data is occurs, the sending continues to send the data from the point where the transmission of the data previously stopped.

7. A method as recited in claim 3, wherein said searching (a) comprises:

(a1) sending a lookup operation over the network;

(a2) receiving, over the network, responses to the lookup operation from the computing devices available to receive the data over the network; and (a3) determining whether the computing devices available to receive the data has changed.

8. A method as recited in claim 3, wherein said displaying (b) causes indicators to be added or removed from the screen display of the first computing device as the computing devices available to receive the data changes.

9. A method as recited in claim 3, wherein the data being sent to the second computing device is associated with a file transfer from the first computing device to the second computing device.

10. A method as recited in claim 3, wherein the first and second computing devices are computers, and the network is a wireless network, and wherein the data being sent to the second computing device is associated with a file transfer from the first computing device to the second computing device.

11. A method for transmitting data from a first computing device to a second computing device via a network, said method comprising:

(a) searching the network for computing devices available to receive data over the network;

(b) determining if the second computing device is one of the computing devices available to receive data over the network;

(c) establishing a connection via the network from the first computing device to the second computing device when the second computing device is available and when there is data to be transmitted from the first computing device to the second computing device;

(d) sending data from the first computing device to the second computing device over the network;

(e) monitoring the availability of the second computing device to receive the data over the network;

(f) suspending said sending (d) of the data to the second computing device if the second computing device loses availability;

(g) maintaining the connection from the first computing device to the second computing device via the network during said suspending (f);

(h) resuming said sending (d) of the data to the second computing device if the second computing device regains availability; and (i) terminating the connection from the first computing device to the second computing device if the second computing device does not regain availability.

12. A method as recited in claim 11, wherein said maintaining (g) maintains the connection open only for a first predetermined period of time.

13. A method as recited in claim 11, wherein said monitoring (e) is performed on a periodic basis during said sending (d) and said suspending (f).

14. A method as recited in claim 11, wherein said resuming (h) is permitted only after the second computing device regains availability and remains available for a second predetermined period of time.

15. A method as recited in claim 11, wherein the data being sent to the second computing device is associated with a file transfer from the first computing device to the second computing device.

16. A method as recited in claim 11, wherein the first and second computing devices are computers, and the network is a wireless network, and
wherein the data being sent to the second computing device is associated with a file transfer from the first computing device to the second computing device.

17. A system for transmitting data from a first computing device to a second computing device, said system comprising:

a network capable of interconnecting the first computing device to a plurality of other computing devices including the second computing device;

search means for searching the network to determining which of other devices on the network are available to receive data from the first computing device;

a display screen, said display screen displaying at least an indicator for each of the available devices on the network;

data transfer means for transferring of data from the first computing device to the second computing device via a network link, provided one of the indicators on said display screen corresponds to the second computing device, with the network link supporting a connection between the first computing device and the second computing device;

a message window for displaying a message on said display screen of the first computing device when the second computing device becomes unavailable to receive the data after the transfer of data has began but before the transfer of data is complete; and data transfer resumption means for resuming the transfer of data if the second computing device again becomes available, wherein when the second computing device becomes unavailable during the transfer of the data to the second computing device, the transfer of the data stops but the connection from the first computing device to the second computing device via the network link temporarily remains open so that the transfer of the data can resume if the second computing device again becomes available before the connection is lost.

18. A system as recited in claim 17, wherein the first computing device and the second computing device are both portable computers, and the first and second computing devices are portable computers, and the network link is a wireless link.

19. A system as recited in claim 18, wherein the wireless network is a dedicated wireless infrared link established between the portable computers.

20. A system as recited in claim 17, wherein said search means continues to search the network to determine whether the second computing device remains available to receive data from the first computing device via the network.

21. A system as recited in claim 20, wherein said system further comprises:

a data queue for storing data transmission requests from the first computing device to other computing devices over the network.

22. A system as recited in claim 21, wherein said data queue indicates availability of each of the data transmission requests stored therein, and wherein said data transfer means selects one of the data transmission requests stored in the data queue for transmission over the network based on at least availability of the receiver.

23. A system as recited in claim 21, wherein said data queue indicates availability of each of the data transmission requests stored therein as well as a busy state if the transmission request is to a computing device which is busy receiving another transmission request over the network, and wherein said data transfer means selects one of the data transmission requests stored in the data queue for transmission over the network based on at least availability of the receiver.

24. A system as recited in claim 23, wherein said search means maintains a receiver availability list for use when determining whether receivers which were previously available have become unavailable.

25. A system as recited in claim 17, wherein the network is a wireless network.

26. A system as recited in claim 25, wherein the wireless network is an infrared wireless network.

27. A system as recited in claim 17, wherein said network is a wired network.

28. A computer readable medium containing program instructions for transmitting data over a network link, said computer readable medium comprising:

computer readable code devices for searching the network for computing devices available to receive data over the network;

computer readable code devices for displaying an indicator for each of the computing devices available to receive data on a display screen of a first computing device;

computer readable code devices for establishing a connection via the network from the first computing device to a second computing device; and computer readable code devices for sending data from the first computing device to the second computing device over the network while monitoring the availability of the second computing device to receive the data over the networks;

computer readable code devices for stopping the sending of the data when the second computing device becomes unavailable;

computer readable code devices for determining whether the second computing device regains availability before the connection is lost; and computer readable code devices for resuming the sending of the data after a temporary interruption when the determining operates to determine that the availability of the second computing device is regained before the connection is lost.

29. A user interface for a computer system, the user interface being visually displayed on a display screen of the computer system, the computer system being connected to a network of other devices, said user interface comprising:

search means for searching the network to determine the devices on the network available to receive data from the computer system;

display means for displaying on the display screen a window having an indicator for each of the available devices on the network;

means for periodically updating said window so that the indicators displayed provide an accurate account of the available devices;

means for invoking a transfer of data from the computer system to a selected one of the available devices;

a message window for displaying a message on the display screen of the computer system when the selected one of the available devices to which data is being sent becomes unavailable to receive the data before the transmission of the data is complete, the message indicating the stoppage of the transfer of the data when the selected one of the available devices becomes unavailable and that resumption of the transfer of data can be had if the availability of the selected one of the available devices returns within a predetermined period of time.

* * * * *